United States Patent [19]

Setoya

[11] Patent Number: 4,603,287
[45] Date of Patent: Jul. 29, 1986

[54] METHOD OF DRIVING 5-PHASE STEPPING MOTOR

[75] Inventor: Noboru Setoya, Osaka, Japan

[73] Assignee: Mycom Kabashiki Kaisha, Kyoto, Japan

[21] Appl. No.: 696,605

[22] Filed: Jan. 30, 1985

[30] Foreign Application Priority Data

Apr. 21, 1984 [JP] Japan .................................. 59-80600

[51] Int. Cl.$^4$ ................................................ H02P 8/00
[52] U.S. Cl. ........................................ 318/696; 318/685
[58] Field of Search ................................ 318/696, 685

[56] References Cited

U.S. PATENT DOCUMENTS 3,842,332 10/1974 Heine et al. .......................... 318/696

Primary Examiner—William M. Shoop, Jr.
Assistant Examiner—Saul M. Bergmann
Attorney, Agent, or Firm—Armstrong, Nikaido, Marmelstein & Kubovcik

[57] ABSTRACT

One end of each of coils of a group of phases A, C, and E among coils of phases A, B, C, D, and E which are wound in turn around stator poles of the 5-phase stepping motor is connected to one end of each of coils of another group of phases B and D so that coils of a group of phases A, C, and E are in antiphase with respect to coils of another group of phases B and D. Two or three of the abovesaid five phases are suitably selected to be excited in parallel and further the other two or three phases are excited in parallel so as to be connected in series with the former two or three phases excited in parallel. In this way, the 5-phase stepping motor is driven by selectively exciting the phases and thereby sequentially changing the direction of a resultant vector.

1 Claim, 13 Drawing Figures (a)

(b)

(c)

(d)

(e)

(f)

METHOD OF DRIVING 5-PHASE STEPPING MOTOR

BACKGROUND OF THE INVENTION (1) Field of the Invention

The present invention relates to a method of driving the 5-phase stepping motor.

(2) Description of the Prior Art

For driving the 5-phase stepping motor, the so-called standard, pentagon, and star drive methods have been proposed and employed in practice. However, when depending on the pentagon and the star drive methods, a half-step drive with 4-5-phase excitation is difficult to perform and, therefore, the standard drive method is chiefly employed for said half-step drive.

FIG. 1 is a circuit diagram for the standard drive method as the prior art.

In the drawing, the reference numerals 1 through 5 indicate phases A through E, respectively, each consisting of a coil wound around a stator pole of the 5-phase stepping motor. Each phase is actuated by transistors 6a through 6d to be in in-phase or antiphase with respect to the other phase. The numeral 7 indicates a power source for supplying field current to each phase.

As apparent from the drawing, in this drive method, four transistors are used for each phase and accordingly twenty transistors in total are required for composing an output step, which results in such drawback as increase in heat generation in the output step, enlarged size of the step, and complicated control circuit for controlling the step.

Further, because of a structure in which all phases are excited in parallel, the power source is required to supply four to five times as much as the rated current (current that can be supplied to each phase) of the motor correspondingly to 4-5-phase excitation. Thus, the conventional drive method has a disadvantage which requires the use of a power source of large current capacity.

SUMMARY OF THE INVENTION

It is an object of the present invention to provide a method of driving the 5-phase stepping motor which enables 4-5-phase excitation with a relatively small number of transistors and the use of a power source of a relatively small current capacity.

In brief, a method of driving the 5-phase stepping motor according to the present invention is characterized in that one end of each of coils of a group of phases A, C, and E among coils of phases A, B, C, D, and E arranged in turn in the 5-phase stepping motor is connected to one end of each of coils of another group of phases B and D so that the former group is in antiphase with the latter group, two or three of said five phases are suitably selected to be excited in parallel, and the other two or three phases are excited in parallel so as to be connected in series with the former two or three phases excited in parallel, whereby the 5-phase stepping motor is driven by sequentially changing the direction of a resultant vector.

Since a method of driving the 5-phase stepping motor according to the present invention is applied to control over excitation so that all phases are connected to each other alternately in series and parallel, the number of actuating transistors in the output step can be reduced to ten. Therefore, according to the present invention, application of 4-5-phase excitation to the 5-phase stepping motor is made possible by transistors in the number reduced to a half of that in the conventional apparatus.

The present invention further employs excitation in series and therefore permits power source current to be increased from two to two and a half times as much as the rated current of the motor. Thus, the present invention enables the use of a power source smaller in current capacity than that used in the conventional method.

DESCRIPTION OF THE PREFERRED EMBODIMENT

Figure 2:
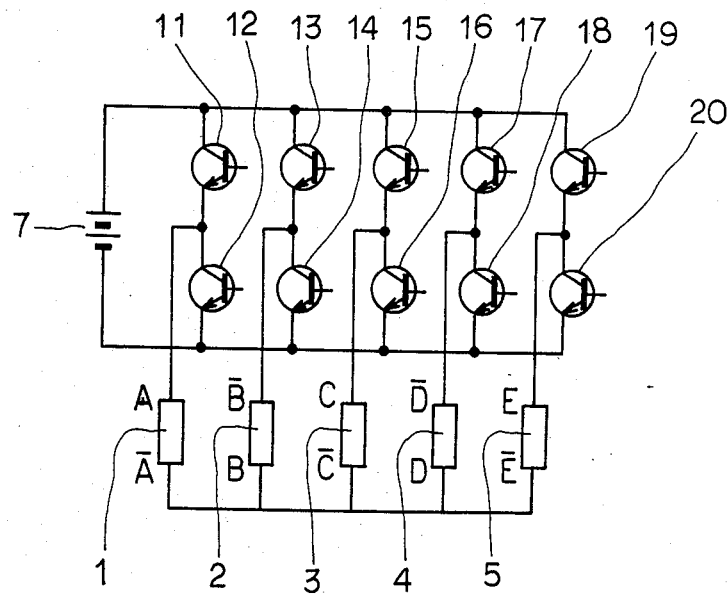
FIG. 2 is a circuit diagram outlining the structure of a driving apparatus employing an embodiment of a method of driving the 5-phase stepping motor according to the present invention.

FIG. 2 is a circuit diagram outlining the structure of a driving apparatus employing an embodiment of a method of driving the 5-phase stepping motor according to the present invention.

Figure 1:
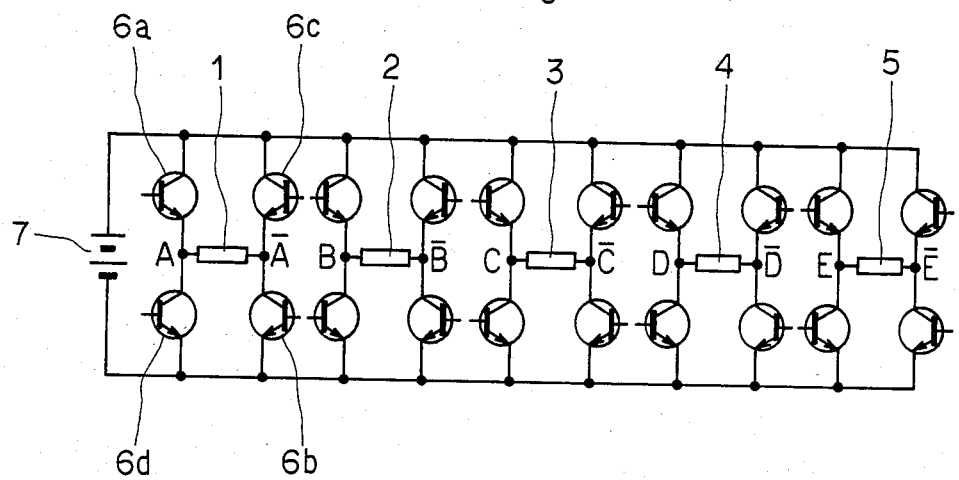
FIG. 1 is a circuit diagram for the standard drive method as the prior art.

In this drawing and FIG. 1, like reference numerals are applied to like parts. One end of each of a group of coils 1, 3, and 5 of phases A, C, and E, respectively, is connected to one end of each of a group of coils 2 and 4 of phases B and D, respectively, so that both groups are in antiphase with each other.

The reference numerals 11 through 20 represent transistors each serving to excite each phase. Each of emitters of the transistors, 11, 13, 15, 17, and 19 is connected to each of collectors of the transistors 12, 14, 16, 18, and 20, respectively. Each couple of transistors 11 and 12, 13 and 14, 15 and 16, 17 and 18, and 19 and 20 are connected in series, respectively, with respect to the power source 7. The other end of each of coils of phases A through E is connected to a connection point of each of couples of transistors 11 and 12, 13 and 14, 15 and 16, 17 and 18, and 19 and 20.

A method of driving by means of an embodiment of the present invention will be described by way of description of performance of the driving apparatus in such a structure as above.

Figure 3:
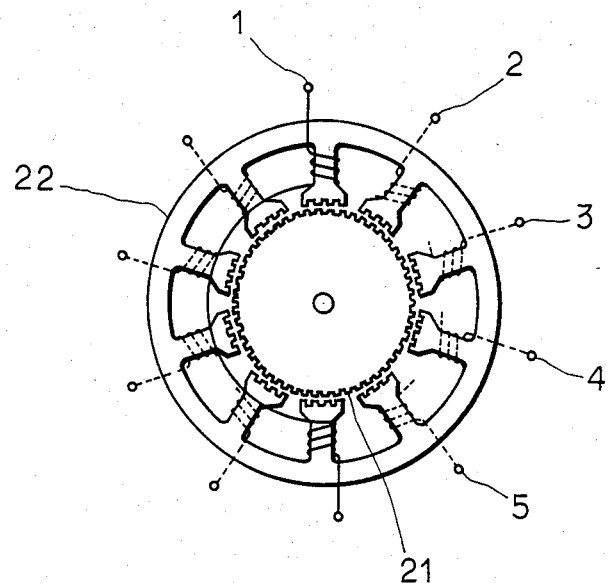
FIG. 3 is a schematic view outlining the structure of a 5-phase stepping motor to which said embodiment is applied.

FIG. 3 is a schematic view outlining the structure of a 5-phase stepping motor to which an embodiment of the present invention is applied.

The rotor 21 is provided with fifty teeth. The stator 22 comprises ten poles, and a set of teeth on a pole are arranged so as to be shifted from that of teeth on the adjoining pole by a distance equal to 1/10 of a pitch of teeth of the rotor. Coils are wound on the poles so that opposing two poles may have the same polarity (N or S), thereby five couples of phases A through E consisting of coils 1 through 5, respectively, being formed and connected to each other as shown in FIG. 2.

Figure 4:
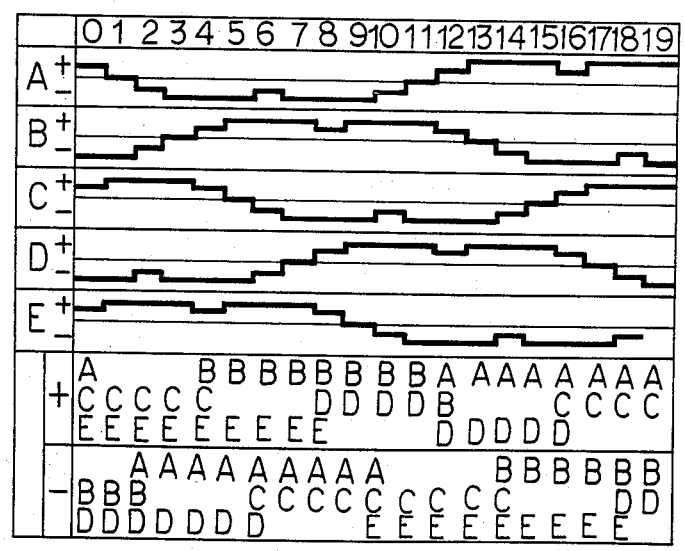
FIG. 4 is a diagram showing current waveforms and excitation directions to be imparted to all phases.

FIG. 4 is a diagram showing current waveforms and excitation directions to be imparted to all phases. Excitation directions are assumed in such a way that, with respect to the coils 1, 3, and 5 of phases A, C, and E, respectively, current flowing, for example, from A to $\overline{A}$ as indicated as plus (+) and that from $\overline{A}$ to A as minus (−), and, with respect to the coils 2 and 4 of phases B and D, respectively, which are in antiphase with the former three phases, current flowing, for example, from $\overline{B}$ to B and that from B to $\overline{B}$ are indicated as plus (+) and minus (−), respectively.

The numerals 0 through 19 in FIG. 4 indicate states (steps) of sequential excitation of phases.

For instance, at the step 0, transistors 11, 14, 15, 18, and 19 are conductive whereas the other transistors not. Current supplied by the power source 7 is fed into the coils 1, 3, and 5 of phases A, C, and E, respectively, through transistors 11, 15, and 19, respectively, and further into the coils 2 and 4 of phases B and D. Therefore, a group of coils 1, 3, and 5 of phases A, C, and E, respectively, are excited in parallel in the plus (+) direction whereas another group of coils 2 and 4 of phases B and D, respectively, are excited in parallel in the minus (−) direction, both groups being connected to each other in series. On the assumption that the rated current of the motor is I, the power source 7 can satisfy the purpose by supplying excitation current of 2×I. As shown by current waveforms at the step 0 in FIG. 4, current of 2I/3 ((+) direction) is supplied to each of coils 1, 3, and 5 of phases A, C, and E, respectively, whereas current of I ((−) direction) to each of coils 2 and 4 of phases B and D, respectively.

FIGS. 5(a) through 5(h) represent vector diagrams of torque generated in all phases at the abovesaid steps. In these drawings, vectors marked as ↑ and   indicate torque in each phase and resultand torque, respectively. Torque in each phase of the 5-phase stepping motor is considered to be represented by a vector directionally changing by an electrical angle $\theta e$ of 36°. This electrical angle $\theta e$ is converted into a mechanical angle $\theta m$ as follows:

$\theta m$ = Pitch angle of teeth of rotor/10
= 7.2/10 = 0.72°

Figure 5:
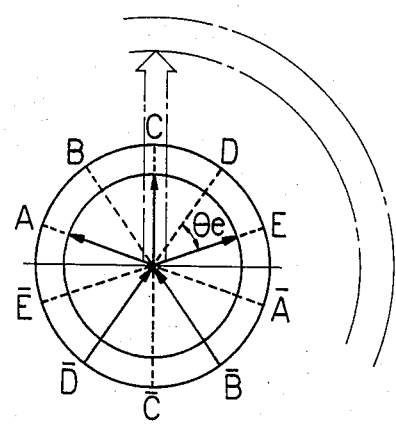
FIGS. 5(a) through 5(h) are diagrams showing torque vectors generated in all phases; and, FIG. 6 is a diagram showing the loci drawn by resultant torque vectors.
Figure 5:
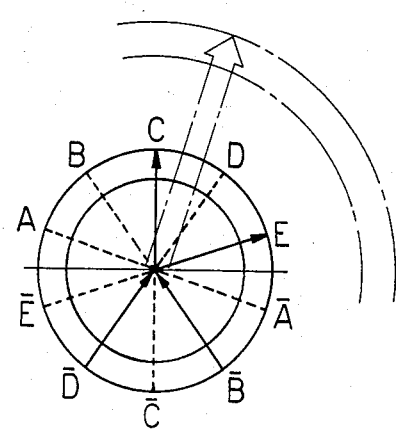
Figure 5:
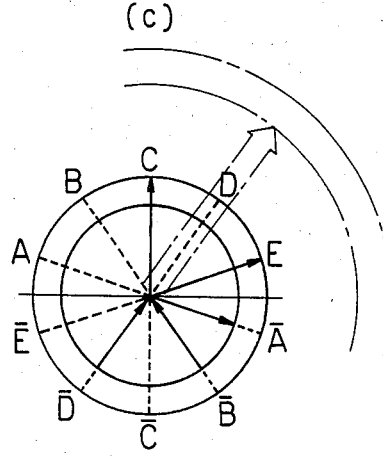
Figure 5:
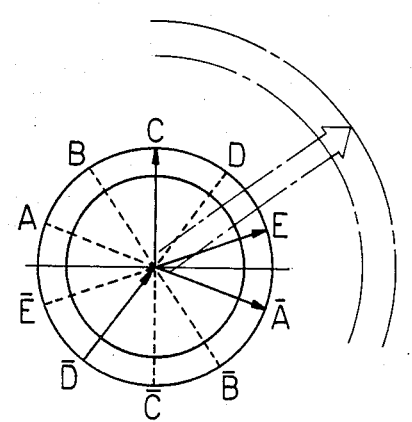
Figure 5:
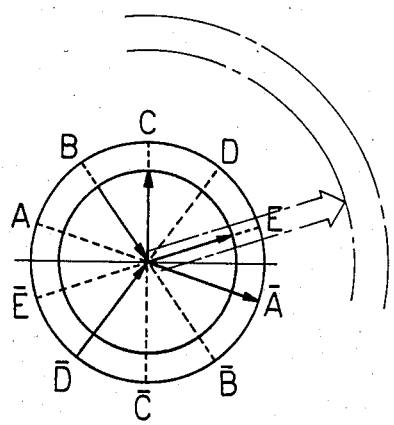
Figure 5:
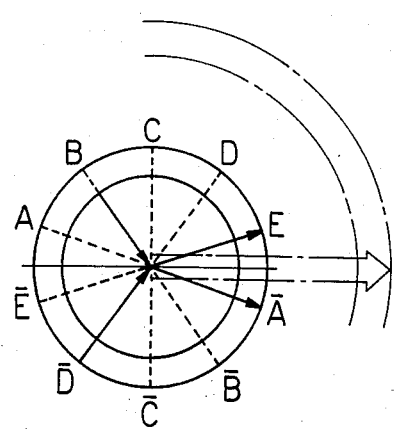
Figure 5:
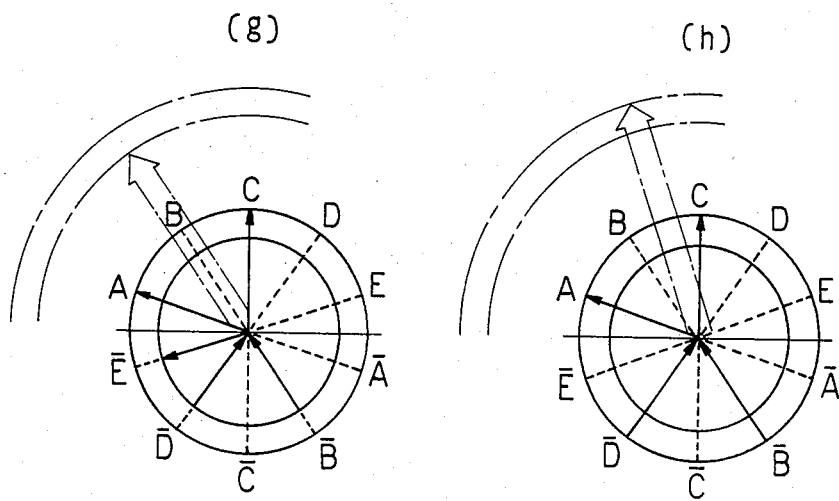

FIG. 5(a) is a diagram showing a vector at the abovesaid step 0. When each phase is excited as described above, the stepping motor is put in the state of 5-phase excitation and a resultant torque vector extends in the same direction as that of torque vector of the phase C.

Then, the subsequent step 1 will be described. At the step 1, a transistor 11 that has been conductive at the step 0 is turned off and thereby the motor is put in the state of 4-phase excitation. The waveforms, as shown in FIG. 4, indicate current of I in the coils 3 and 5 of phases C and E ((+) direction) and also current of I in the coils 2 and 4 of phases B and D ((−) direction). At this time, a resultant vector is directed, as shown in FIG. 5(b), to the midposition between the phases C and D. The rotor, therefore, turns by 0.36° (equivalent to a half step) clockwise.

At the step 2, as shown in FIG. 5(c), the motor is in the state of 5-phase excitation. The waveforms show that current amounts to I ((+) direction) at the coils 3 and 5 of phases C and E and to 2I/3 ((+) direction) at the coils 1, 2, and 4 of phases A, B, and D, respectively. A resultant torque vector extends in the same direction as that of torque vector in the phase D. The rotor turns by 0.72° with respect to the position thereof at the step 0.

Afterward, the direction of resultant torque sequentially changes as shown in FIGS. 5(d) through 5(h) with feeding of current into every phase as shown at the steps 3 through 19. With the directional change of resultant torque, the rotor turns and, upon completion of one revolution of the above-said torque vector, the rotor turns by 7.2°.

Figure 6:
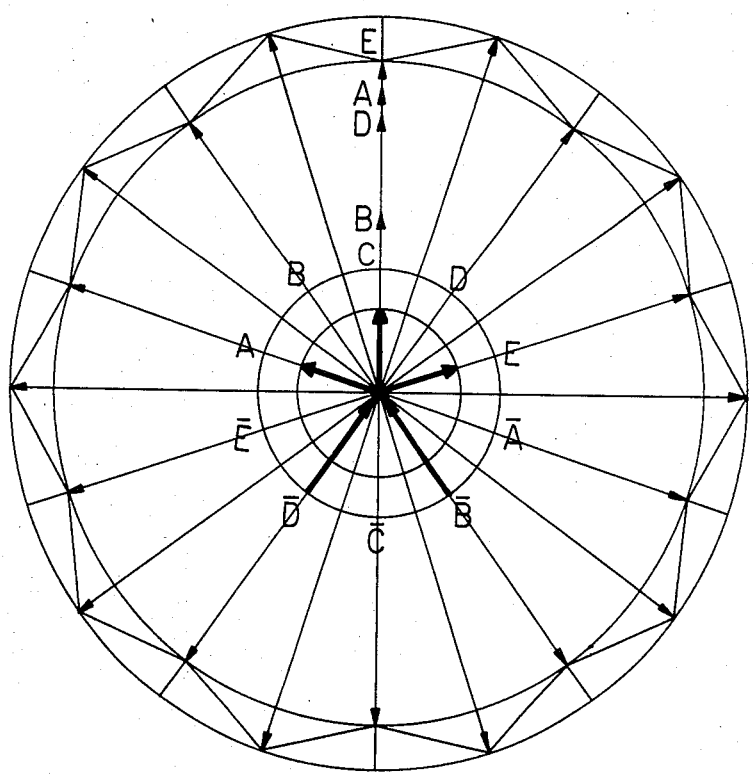

FIG. 6 is a diagram showing the loci drawn by resultant torque vectors. As apparent from the drawing, a magnitude of resultant torque vector at the time of 5-phase excitation is smaller than that at the time of 4-phase excitation. However, a difference between two vectors of such a degree as shown is almost out of the question in the practical application. A difference between torque vectors can be removed by adapting the supply of current at the time of 5-phase excitation to be larger than that at the time of 4-phase excitation.

What is claimed is:

1. A method of driving a 5-phase stepping motor in which one end of each of coils of a group of phases A, C and E among coils of phases A, B, C, D and E arranged in turn in the 5-phase stepping motor is connected to one end of each of coils of another group of phases B and D so that the former group is in antiphase with respect to the letter group, said method comprising the steps of:

exciting two or three suitably selected of said five phases in parallel;

exciting the other three or two phases in parallel so as to be connected in series with the former two or three phases excited in parallel; and thus driving the 5-phase stepping motor by sequentially changing the direction of a resultant vector.

* * * * *